(12) United States Patent
Hooshmand et al.

(10) Patent No.: US 10,680,455 B2
(45) Date of Patent: Jun. 9, 2020

(54) DEMAND CHARGE MINIMIZATION IN BEHIND-THE-METER ENERGY MANAGEMENT SYSTEMS

(71) Applicant: NEC Laboratories America, Inc., Princeton, NJ (US)

(72) Inventors: Ali Hooshmand, San Jose, CA (US); Ratnesh Sharma, Fremont, CA (US); Korosh Vatanparver, Santa Clara, CA (US)

(73) Assignee: NEC Corporation (JP)

( * ) Notice: Subject to any disclaimer, the term of this patent is extended or adjusted under 35 U.S.C. 154(b) by 50 days.

(21) Appl. No.: 16/180,415

(22) Filed: Nov. 5, 2018

(65) Prior Publication Data
US 2019/0140465 A1   May 9, 2019

Related U.S. Application Data

(60) Provisional application No. 62/581,848, filed on Nov. 6, 2017.

(51) Int. Cl.
*H02J 7/00* (2006.01)
*G06Q 50/06* (2012.01)

(52) U.S. Cl.
CPC ............ *H02J 7/0069* (2020.01); *G06Q 50/06* (2013.01); *H02J 7/0021* (2013.01);
(Continued)

(58) Field of Classification Search
None
See application file for complete search history.

(56) References Cited

U.S. PATENT DOCUMENTS 8,706,650 B2 *   4/2014   Ozog .................... G06Q 10/06
                                                            705/412
9,935,473 B2 *   4/2018   Tsurumaru ................ H02J 3/32
(Continued)

OTHER PUBLICATIONS

A. Y. Ng et al., "On Spectral Clustering: Analysis and an algorithm," 2002 IEEE, 8 pages. (Year: 2002).*
(Continued)

*Primary Examiner* — Leigh M Garbowski
(74) *Attorney, Agent, or Firm* — Joseph Kolodka

(57) ABSTRACT

Systems and methods for controlling behind-the meter energy storage/management systems (EMSs) for battery-optimized demand charge minimized operations, including determining an optimal monthly demand charge threshold based on a received customer load profile and a customer load profile and savings. The determining of the monthly demand charge threshold includes iteratively performing daily optimizations to determine a daily optimal demand threshold for each day of a month, selecting a monthly demand threshold by clustering the daily optimal demand thresholds for each day of the month into groups, and determining a dominant group representative of a load pattern for a next month. A mean demand threshold for the dominant group is selected as the monthly demand threshold, and continuous battery-optimized demand charge minimized EMS operations are provided based on the monthly demand threshold using a real-time controller configured for overriding the optimal charging/discharging profiles when a monthly demand threshold violation is detected.

20 Claims, 10 Drawing Sheets

(52) U.S. Cl.
CPC ... *G05B 2219/2639* (2013.01); *H02J 7/00034* (2020.01); *H02J 2310/50* (2020.01)

(56) References Cited

U.S. PATENT DOCUMENTS

| | | | | |
|---|---|---|---|---|
| 9,960,637 | B2* | 5/2018 | Sanders | H02J 3/381 |
| 9,979,202 | B2* | 5/2018 | Sudan | H02J 13/00007 |
| 10,222,083 | B2* | 3/2019 | Drees | F24F 11/84 |
| 10,460,264 | B2* | 10/2019 | Sun | G06Q 10/04 |
| 2018/0226800 | A1* | 8/2018 | Bhattarai | H02J 13/0006 |

OTHER PUBLICATIONS

J. Neubauer, "Battery Lifetime Analysis and Simulation Tool (BLAST) Documentation," Technical Report, NREL, Dec. 2014, 31 pages. (Year: 2014).*

R.T de Salis et al., "Energy Storage Control for Peak Shaving in a Single Building," 2014 IEEE, pp. 1-5. (Year: 2014).*

M. Muratori et al., "Residential Demand Response: Dynamic Energy Management and Time-Varying Electricity Pricing," IEEE Trans . on Power Systems, vol. 31, No. 2, Mar. 2016, pp. 1108-1117. (Year: 2016).*

I. Alsaidan et al., "Battery Energy Storage Sizing for Commercial Customers," 2017 IEEE, 5 pages. (Year: 2017).*

R. Moslemi et al., "A Machine Learning Based Demand Charge Management Solution," 2017 IEEE PES Innovative Smart Grid Technologies Conference Europe (ISGT—Europe), Sep. 26-27, 2017, 6 pages. (Year: 2017).*

Z. Wang et al., "Stochastic Demand Charge Management for Commercial and Industrial Buildings," 2017 IEEE, 5 pages. (Year: 2017).*

A. Zurfi et al., "Economic Feasibility of Residential Behind-the-Meter Battery Energy Storage Under Energy Time-of_use and Demand Charge Rates," 6th Int'l Conference on Renewable Energy Research and Applications, Nov. 5-8, 2017, pp. 842-849. (Year: 2017).*

Chen et al., "Smart Energy Management System for Optimal Microgrid Economic Operation", IET Renewable Power Generation, Apr. 2011, 258-267, vol. 5, Issue 3.

Kanchev et al., Energy Management and Operational Planning of a Microgrid with a PV-Based Active Generator for Smart Grid Applications. IEEE Transactions on Industrial Electronics, Feb. 2011, 4583-4592, vol. 58, Issue 10.

* cited by examiner

DEMAND CHARGE MINIMIZATION IN BEHIND-THE-METER ENERGY MANAGEMENT SYSTEMS

RELATED APPLICATION INFORMATION

This application claims priority to provisional application No. 62/581,848, filed on Nov. 6, 2017, incorporated herein by reference herein its entirety.

BACKGROUND

Technical Field

The present invention relates to management of energy storage/management systems, and more particularly to management of behind-the meter energy storage/management systems for battery-optimized demand charge minimization.

Description of the Related Art

Large monthly demand charges of commercial and industrial entities is a major problem for their economical business. This is mainly due to the maximum power demands from the utility during a month. Utilizing a battery by the behind-the-meter Energy Management Systems (EMS) has been seen as a solution to demand charge reduction. In state-of-the-art approaches, the EMS attempts to maintain sufficient energy for the unexpected large demands and use the battery instead to meet the power demand. However, large amount of energy stored in the battery can increase the average battery State-of-Charge (SoC) and further cause degradation in the battery capacity and performance. Therefore, the conventional approaches of demand charge reduction significantly shortens the battery lifetime which is not economical.

Entities from commercial and industrial domains require electricity for running their business. These entities contribute to 62% of the total electricity consumption in the United States. Typically, electric utilities provide these entities with their need of electricity. Demanded power by each customer varies based on their daily business and operation. In return, the utilities charge the customers according to their rate policy and agreement. Electrical utility customers for commercial and industrial domains are charged according to the policy defined by their utility. The payable amount in the electricity bill is defined not only by the amount of the energy usage, but also by the load demand during a monthly cycle. These values depend on the pattern of the customer load throughout the billing month. The utilities charge the customers based on the peak of their power demand throughout the month, despite the fact that the average power demand is much lower. Hence, a large monthly demand charge contributes to a noticeable part of the electricity bill, in addition to the expense of replacing failing batteries prior to an expected fail date contributing to a noticeable part of overall operating expenses for an EMS.

SUMMARY

According to an aspect of the present invention, a method is provided for controlling behind-the meter energy storage/management systems (EMSs) for battery-optimized demand charge minimized operations, including determining an optimal monthly demand charge threshold based on a received customer load profile and a customer load profile and savings. The determining of the monthly demand charge threshold includes iteratively performing daily optimizations to determine a daily optimal demand threshold for each day of a month, selecting a monthly demand threshold by clustering the daily optimal demand thresholds for each day of the month into groups, and determining a dominant group representative of a load pattern for a next month. A mean demand threshold for the dominant group is selected as the monthly demand threshold, and continuous battery-optimized demand charge minimized EMS operations are provided based on the monthly demand threshold using a real-time controller configured for overriding the optimal charging/discharging profiles when a monthly demand threshold violation is detected.

According to another aspect of the present invention, a system is provided for controlling behind-the meter energy storage/management systems (EMSs) for battery-optimized demand charge minimized operations, including determining an optimal monthly demand charge threshold based on a received customer load profile and a customer load profile and savings using a processor device operatively coupled to a computer-readable storage medium. The determining of the monthly demand charge threshold includes iteratively performing daily optimizations to determine a daily optimal demand threshold for each day of a month, selecting a monthly demand threshold by clustering the daily optimal demand thresholds for each day of the month into groups, and determining a dominant group representative of a load pattern for a next month. A mean demand threshold for the dominant group is selected as the monthly demand threshold, and continuous battery-optimized demand charge minimized EMS operations are provided based on the monthly demand threshold using a real-time controller configured for overriding the optimal charging/discharging profiles when a monthly demand threshold violation is detected.

According to another aspect of the present invention, a computer-readable storage medium including a computer-readable program is provided, and the computer-readable program when executed on a computer causes the computer to control behind-the meter energy storage/management systems (EMSs) for battery-optimized demand charge minimized operations, including determining an optimal monthly demand charge threshold based on a received customer load profile and a customer load profile and savings. The determining of the monthly demand charge threshold includes iteratively performing daily optimizations to determine a daily optimal demand threshold for each day of a month, selecting a monthly demand threshold by clustering the daily optimal demand thresholds for each day of the month into groups, and determining a dominant group representative of a load pattern for a next month. A mean demand threshold for the dominant group is selected as the monthly demand threshold, and continuous battery-optimized demand charge minimized EMS operations are provided based on the monthly demand threshold using a real-time controller configured for overriding the optimal charging/discharging profiles when a monthly demand threshold violation is detected.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
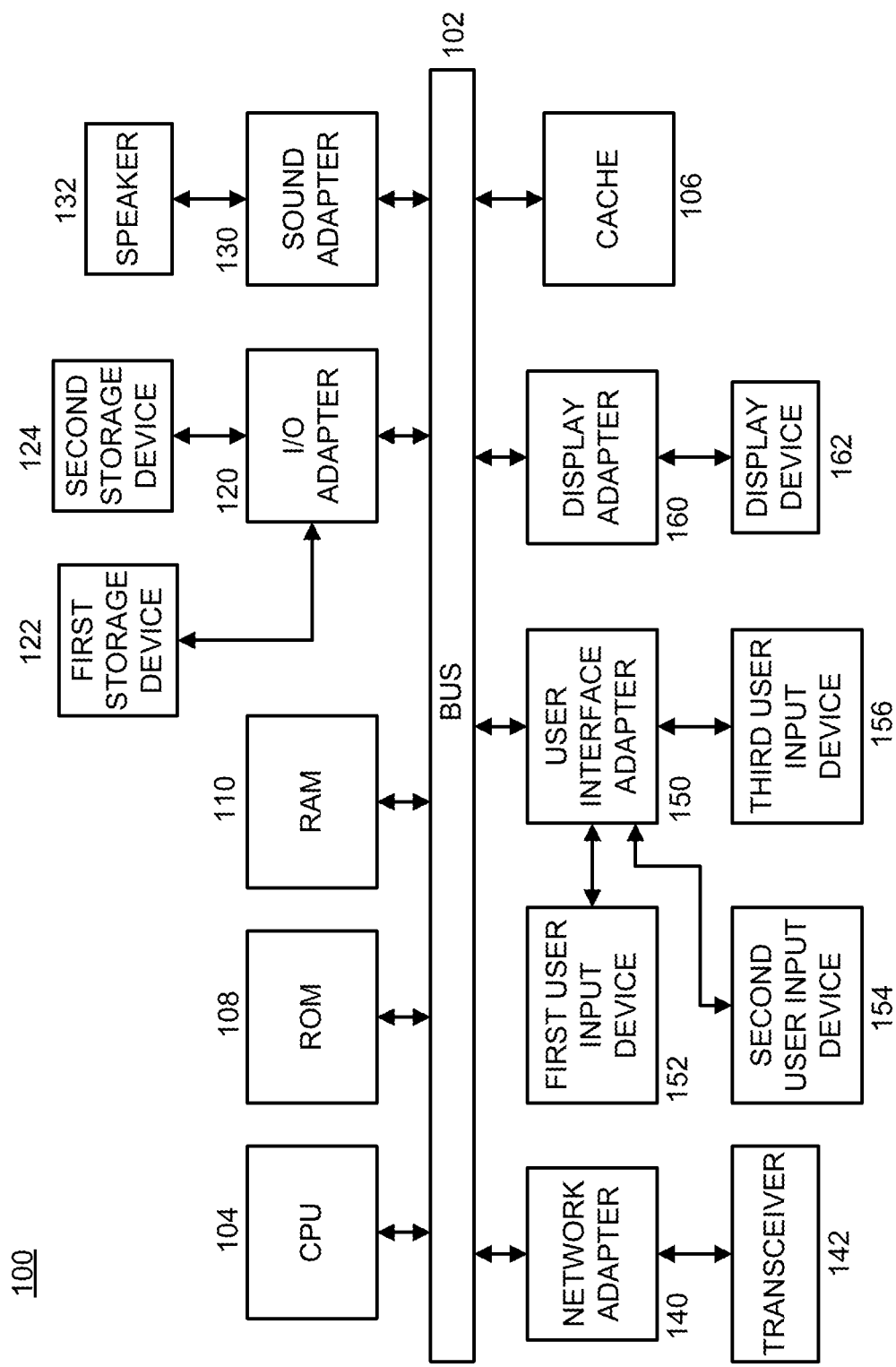
FIG. 1 is a block/flow diagram illustrating an exemplary processing system to which the present principles may be applied, in accordance with the present invention.

In accordance with the present invention, systems and methods are provided for management of behind-the meter energy storage/management systems for battery-optimized demand charge minimization.

In one embodiment, in order to reduce the monthly demand charges, an energy storage device (e.g., battery), controlled by a Behind-The-Meter (BTM) Energy Management System (EMS) can be implemented in accordance with the present invention. The EMS can exploit the battery such that the monthly peak of the grid power decreases and thereby the demand charges by the utility are reduced, and/or the EMS can supply power to the customer using the battery when load demands are larger than a monthly demand threshold in order to shave the grid power from utility.

In various embodiments, the EMS can include two layers, a daily layer and a monthly layer for battery-optimized demand charge minimization in accordance with the present invention. The daily layer can be utilized as a real-time controller that adjusts the split of the customer load demand among the battery and the grid. The charging and discharging power of the battery can be controlled according to the monthly demand threshold.

The monthly layer in the EMS can be employed to determine an optimal monthly demand threshold for the daily layer such that the demand charge is reduced. The monthly demand threshold set by the monthly layer can influence the demand charge reduction resulted by applying and/or running/executing the daily layer. Moreover, the layers also influence the charging and discharging behavior of the battery, which can significantly extend battery lifetime and maximize performance in accordance with various embodiments of the present invention. The battery State-of-Charge (SoC) and battery throughput are among a plurality of important battery operating conditions affected in, and controlled by the daily layer in accordance with the present invention. Controlling such conditions is important when managing an EMS for optimal performance, as large values of annual average battery SoC and battery throughput (e.g., above a pre-determined threshold level) can result in significant battery capacity loss, and losing such battery capacity can significantly shorten the battery lifetime.

In various embodiments, the monthly layer can evaluate a monthly demand threshold from the results determined from multiple daily optimizations for each day of a month in accordance with the present invention. Each daily optimization can provide an optimal demand threshold for that day, and one value can be selected as the monthly demand threshold in accordance with the present invention. A major challenge of this selection is the lack of knowledge about the load pattern of the next month. The selection algorithm can be challenging since the final value may underestimate or overestimate the optimal demand threshold required for the next month. Overestimating the demand threshold may result in less demand charge savings and very low utilization of battery and large average SoC. On the other hand, underestimating the demand threshold may result in more demand threshold violations and very low average battery SoC.

If not optimally determined, the monthly demand charge selection can even worsen the performance due to the nondeterministic load demands and unpredictable behavior of the load demands of the next month given the behavior of the current month. In various embodiments, the demand threshold can be selected such that the savings are more than the violations in a majority the months, and can be individually customized/tailored to be appropriate for the load profile of particular consumers in accordance with the present invention.

In accordance with various embodiments, EMS performance in terms of demand charge reduction can highly depend on the monthly demand threshold defined by the monthly layer. For each day of the month, an optimization can be conducted to find the optimal demand thresholds. Optimal selection of the demand thresholds can reduce the monthly demand charges and/or extend the battery lifetime. The demand thresholds evaluated from each optimization (the number of days in a month) can be stored, and one of these values in a specific fixed range can be selected as the monthly demand threshold in accordance with the present invention. For example, in some embodiments, the variation of the thresholds can be considered and the value which is (e.g., 15%-variation) lower than the maximum value can be selected as the monthly threshold. This selected monthly demand threshold can be applied to the daily layer EMS to reduce the monthly demand charge while extending battery lifetime for the consumer.

In conventional approaches, the load pattern of the previous month is given as the prediction of the load pattern for the next month. However, the monthly demand threshold selection plays a significant role in achieving any possible demand charge savings and/or resulting increased battery lifetime for a customer, and this is not accounted for using conventional systems and methods. Further, conventional systems can consider only a fixed range for selecting the demand threshold, which provides suboptimal results for a majority of consumers at least because of the wide range of load profiles and/or consumer-specific demands from different energy customers. Such conventional systems and methods can perform well for a single customer, while at the same time overestimating or underestimating for another customer, which can result in demand threshold violations, low demand charge savings, significant battery capacity loss, and shortened battery lifetime.

In various embodiments, controlling of one or more EMSs based on the determining and selecting of an optimal statistical monthly demand threshold in accordance with the present invention can maximize demand charge savings and increase battery lifetime for the EMSs. This can be achieved by storing and analyzing daily data for each day of the month (e.g., load profile, results from the daily optimizations, etc.). The statistical analysis can be implemented using a clustering machine learning technique (e.g., k-means), and can be employed to categorize the days in a month to multiple groups and types in accordance with various embodiments of the present invention. Thus, a deterministic and adaptive solution (e.g., in terms of demand thresholds) can be evaluated and applied for maximized demand charge savings and increased battery lifetime for a specific load profile and customer in accordance with various embodiments of the present invention.

In accordance with various embodiments of the present invention, real-world experimental results have shown significantly increased demand charge savings and battery lifetime extension as compared to conventional systems and methods for any load profile and customer. In practice, reducing the demand charge savings in accordance with the present invention provides significant benefits to customers by, for example, lowering the cost of operating their business (e.g., battery lifetime extended, demand savings, etc.), and receive a return on their investment in shorter period of time. Moreover, extending the battery lifetime will ensure high quality performance and longevity of the battery and the EMSs, and thus, eliminate the possible cost of replacing a battery after only a short period of time (e.g., 1 year, 2 years, etc. (dependent on manufacturer specifications, battery type, size, etc.) of EMS operation in accordance with the present invention.

In accordance with various embodiments, the present invention can provide a novel battery optimal approach to reduce the monthly demand charges and extend battery lifetime. The load profile of the previous month can be taken into account to optimize daily demand thresholds and shave the daily power demands, while considering the battery lifetime modeling based on manufacturer's warranty. The evaluated demand thresholds can be analyzed statistically, and a monthly demand threshold can be selected to optimize performance of the EMS for the next month. The performance of the present invention has been analyzed and compared to conventional state-of-the-art systems and methods by conducting experiments on multiple real-life load profiles and battery configurations in accordance with various embodiments of the present invention. The results show significant reduction (e.g., 30%) in annual average battery SoC, which increases has been shown to increase battery lifetime (e.g., from 4.2 to 6.4 years) while achieving a significant (e.g., 30%) in demand charge reduction on average, which is described in further detail herein below. For illustrative purposes, monthly billing periods can be assumed, although the present invention is applicable to any other time periods in accordance with various embodiments.

Large electricity bills have always been a problem of electricity customers, and a solution to this problem is energy charge reduction. This can be achieved by reducing the energy consumption at the device level, harvesting energy locally using solar panels, and/or shifting the load to off peak time that has lower energy charge rate (if available). Moreover, utilization of a Behind-The-Meter (BTM) energy storage (e.g., battery) can facilitate these solutions for the purpose of energy charge reduction. Energy Management Systems (EMS) can be implemented to schedule the charging and discharging control actions of the battery for maximum production and battery life in accordance with the present invention.

Energy charge reduction has its own challenges, and, the even more challenging problem of demand charge reduction is a major problem solved by the present invention. As mentioned before, the demand charge mainly depends on the maximum demanded power (e.g., demand peak) from the utility during a month (e.g., billing period). There may be multiple demand charge rates for different times of a day (e.g., time-of-use rate: Off Peak, Partial Peak, Peak) or a year (e.g., seasonal) according to the agreed rate policy with an energy provider. Depending on the operation of the customer and pattern of its electricity demands, very large demand peaks can occur during a month. The large peaks can be due to, for example, a special event or a very busy time in a daily operation. The frequency of occurrence for these large demand peaks is generally low when considered in the context of the whole month, but their influence on the monthly demand charge and/or battery lifetime can be significant.

In accordance with various embodiments of the present invention, leveraging a BTM battery by the EMS can be performed to provide a solution to demand charge reduction. Real-world experiments have shown that a reduction of at least 14% in monthly demand charge can be achieved by shaving the power demands from the utility and using the battery instead in accordance with the present invention. However, in order to get prepared for the unexpected monthly large demand peaks, the EMS needs to maintain sufficient energy stored in the battery. Scheduling the battery utilization, which is the responsibility of the EMS, influences several factors. First, it can indirectly influence the power demand from the utility and thereby the energy and demand charges. Hence, a main objective of the EMS is to reduce these charges. On the other hand, the battery capacity degrades over time with the battery utilization, and the battery lifetime is considered ended when the battery capacity degrades to a certain point (e.g., ~80%). There are two main factors that affect the battery capacity degradation: 1. battery charge and discharge rates (e.g., throughput); and 2. average battery State-of-Charge (SoC). Therefore, the discharging and charging of the battery can also influence the battery capacity degradation and thereby the battery lifetime. Real-world experiments show that the annual average battery SoC is on average 97%, which can degrade the battery capacity by at least 4.7% annually, resulting in expected battery lifetime of about 4.2 years. The resulted short battery lifetime and inevitable battery replacement cost may not be economical for the BTM EMS implemented for the customer, and this problem is solved when using the present system and method.

The problem of demand charge reduction using behind-the-meter EMS poses at least the following key challenges: 1. Improper battery utilization may significantly degrade its lifetime which is not economical for the customers; 2. Current demand threshold selection and optimization approaches can under or overestimate the peak demands; and 3. Influence of demand charge reduction on the battery lifetime and their trade off has been ignored in conventional approaches. To address the above-mentioned challenges, a novel battery optimal demand charge reduction approach for behind-the-meter EMS can be performed in accordance with various embodiments of the present invention, and can include the following: 1. Battery Lifetime Modeling, which can capture the influence of battery utilization parameters such as battery discharged energy and average battery SoC on its lifetime; 2. Cascade Demand Threshold Optimization, which can be implemented by a two-level Mixed-Integer Linear Programming (MILP) that considers the battery lifetime modeling and exact battery charging and discharging behavior as constraints. It can assist the EMS to find the optimal daily demand thresholds that reduce the peak power demands and extend the battery lifetime, and it provides an explicit trade-off between battery lifetime and demand charge savings; and 3. Statistical Monthly Demand Threshold Selection, which can analyze the daily power demands and demand charge savings using clustering and machine learning techniques [20] in order to learn the monthly pattern and evaluate a monthly threshold appropriate for a specific customer load profile in accordance with various embodiments of the present invention.

Large monthly demand charges, as a challenge for the economy of electricity customers, have been addressed by behind-the-meter energy management systems that utilize a battery and minimize the monthly power demands. However, the current approaches do not consider the battery behavior and its lifetime in the EMS. The long-term operation of the EMS and maintaining high average battery SoC results in a significant battery capacity loss and inevitable battery replacement. In the present invention, a novel battery optimal demand charge reduction approach that models and integrates the exact battery behavior and its influence on the battery lifetime can be implemented in accordance with various embodiments.

In some embodiments, a load profile of the previous month can be given to a cascade two-level optimization implemented using Mixed-Integer Linear Programming (MILP) to evaluate daily demand thresholds. The evaluated demand thresholds can be analyzed statistically and a monthly demand threshold is selected using k-means clustering technique to help the EMS for the next month. The performance of the present invention has been analyzed and compared to the state-of-the-arts by conducting experiments on multiple real-life load profiles and battery configurations. The results show significant reduction (e.g., 30%) in annual average battery SoC, which increases the battery lifetime (e.g., from 4.2 to 6.4 years) while achieving 30% demand charge reduction on average in accordance with various embodiments. This is at least partly due to the battery model integration, flexibility achieved by cascade optimization, and more deterministic statistical demand threshold selection of the present invention.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, an exemplary processing system 100 to which the present principles may be applied is illustratively depicted in accordance with one embodiment of the present invention.

In one embodiment, the processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 100, 200, 600, and 900, described with respect to FIGS. 1, 2, 6, and 9, respectively, are systems for implementing respective embodiments of the present invention. Part or all of processing system 100 may be implemented in one or more of the elements of systems 200, 600, and 900, according to various embodiments of the present invention.

Further, it is to be appreciated that processing system 100 may perform at least part of the methods described herein including, for example, at least part of methods 200, 500, 600, 700, and 800 of FIGS. 2, 5, 6, 7, and 8, respectively. Similarly, part or all of system 800 may be used to perform at least part of methods 200, 500, 600, 700, and 800 of FIGS. 2, 5, 6, 7, and 8, respectively, according to various embodiments of the present invention.

Figure 2:
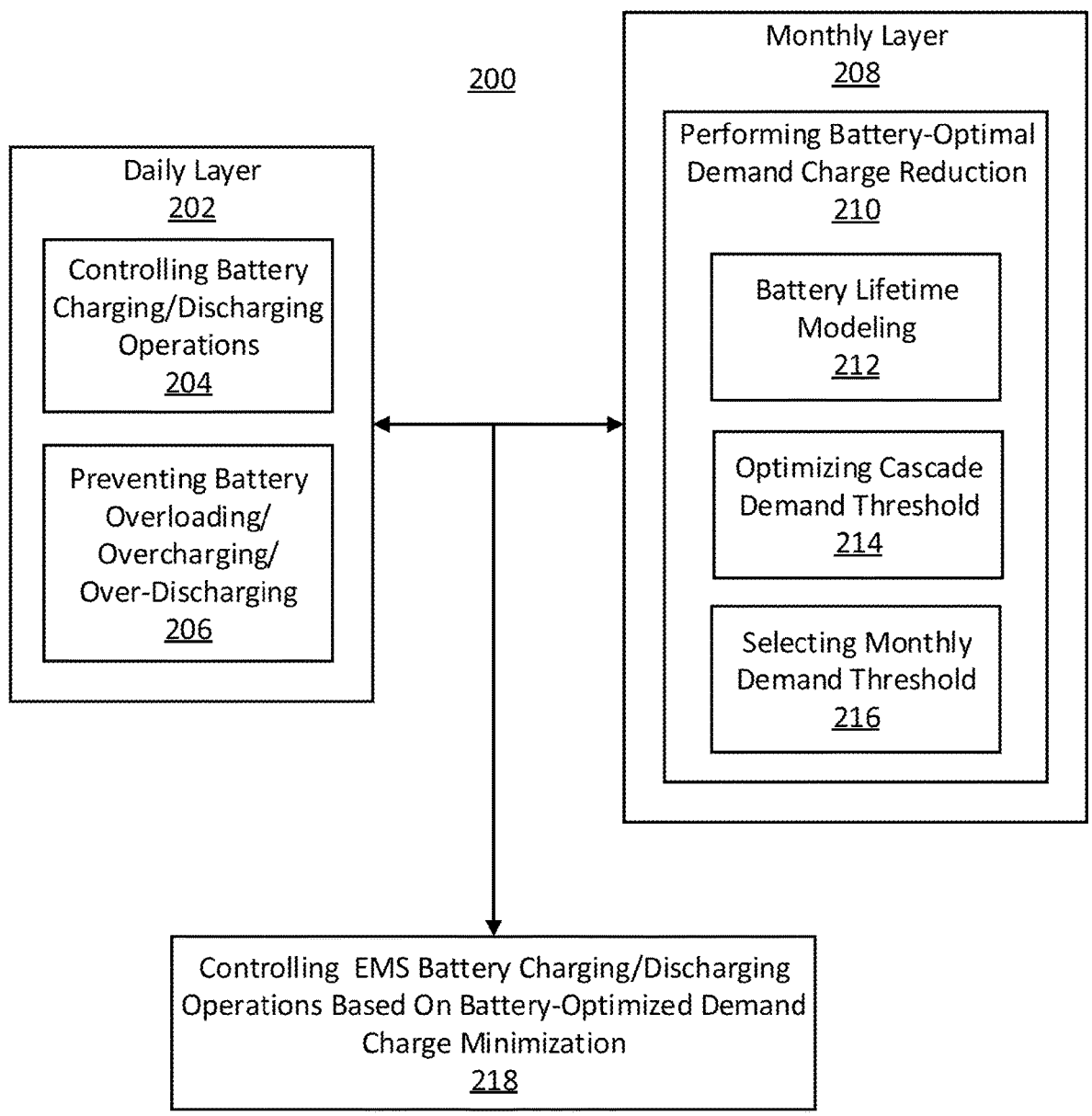
FIG. 2 is a block/flow diagram illustrating a system/method for management of behind-the meter energy storage/management systems for battery-optimized demand charge minimization, in accordance with the present invention.

Referring now to FIG. 2, a system/method 200 for management of behind-the meter energy storage/management systems (EMSs) for battery-optimized demand charge minimization is illustratively depicted in accordance with an embodiment of the present invention. In various embodiments, to reduce the monthly demand charges, a behind-the-meter battery can be controlled by an energy management system in accordance with the present invention. The EMS can exploit the battery such that the monthly peak power demand from the utility decreases, thereby demand charges can be reduced and battery lifetime can be extended. In various embodiments, the system 200 for managing one or more EMSs in accordance with the present can include two layers: a daily layer 202, and a monthly layer 208.

In block 202, a daily layer can be formulated and/or implemented for management of one or more EMSs in accordance with various embodiments of the present invention. The daily layer 202 can implement a controller that splits the customer power demand among the battery and the grid for optimal battery charging and/or discharging operations. In block 204, scheduling and/or controlling of charging and/or discharging operations for one or more EMSs can be executed using, for example, a run-time controller in accordance with various embodiments of the present invention.

In accordance with various embodiments, the controlling of battery operations in block 204 can schedule the discharging and charging control actions of the battery at regular intervals (e.g., every one minute). The daily layer can be formulated as a rule-based control algorithm that uses the given demand threshold for the operation. The control can make decisions based on the demand threshold. For example, if the power demand is determined to be lower than the threshold, the grid can be restricted to be only used for powering. The battery can be charged as well, if there is more power available by the grid. Otherwise, if the power demand is higher than the demand threshold, the grid can power the customer up to the threshold and the battery can be used to power the rest in accordance with the present invention. In this case, the battery can be discharged and can provide power until it has sufficient energy and power capacity.

In block 206, prevention of overloading, overcharging, and/or over-discharging of one or more batteries in one or more EMSs can be performed in accordance with various embodiments of the present invention. A controller in the daily layer 200 can be employed for preventing the battery from over loading, over charging, and/or over discharging in block 206 in accordance with the present invention. For example, in various embodiments, the power demand from the battery can be restricted from becoming larger than the maximum battery power. The energy in the battery cannot become smaller than zero and larger than the battery capacity ($0 \leq SoC \leq 100$). In some instances, if the customer power demand is not satisfied due to, for example, a lack of energy or power, the grid may have to be used, and thus a violation of the demand threshold can occur. The daily layer 202 does not require any prior knowledge of the profile load and it highly depends on the given demand threshold to operate. If a violation occurs, the controller can adopt the demand threshold to the new demand peak since the monthly demand charge is already affected.

In block 208, a monthly layer can be formulated and/or implemented for management of one or more EMSs in accordance with various embodiments of the present invention. The monthly layer in block 208 can determine an optimal monthly demand threshold for the daily layer 202 such that the demand charge can be reduced and battery lifetime can be extended for individual customers based on individual customer load profiles. The EMS performance, in terms of demand charge reduction, can highly depend on the defined monthly demand threshold, and the present invention can be employed to select an optimal monthly demand threshold in accordance with various embodiments.

In some embodiments, the monthly layer in block 208 can incorporate the daily layer 202 operations with battery lifetime modeling in block 212, and can implement an optimization algorithm in block 214 in order to determine an optimal demand threshold and its corresponding battery charging and discharging schedule in block 216. In block 218, the EMS battery charging and/or charging operations can be controlled (e.g., locally and/or remotely) based on this battery-optimized demand charge minimization in accordance with various embodiments of the present invention. Some real-world benefits for consumers from controlling EMS operations according to the present invention are, for example, minimizing of monthly demand charges (e.g., by reducing the peak power from grid), and extending the battery lifetime (e.g., by minimizing the battery discharged energy and average battery SoC) in accordance with the present invention. In some embodiments, due to the limited knowledge available, the load pattern of the previous month can be given as the prediction of the load pattern for the next month, the evaluated values of the daily power demands and demand charge savings in the month can be stored and analyzed, and based on the analysis, a monthly demand threshold can be determined which is optimized and appropriate for one or more specific customer load profiles in accordance with the present invention.

In block 210, battery optimized demand charge reduction for management of one or more EMSs can be performed in accordance with various embodiments of the present invention. The optimization in block 210 can be performed in the monthly layer 208 to formulate the behavior of the battery utilization and/or power demand from the grid at the daily layer 202 given a determined demand threshold. Further, the influence of the battery utilization on its lifetime can taken into account, and these modeling components can be utilized to enable the optimization to determine an optimal demand threshold (e.g., a demand threshold that reduces the demand charge and extends the battery lifetime) in accordance with the present invention.

In block 212, battery lifetime modeling for management of one or more EMSs can be performed in accordance with various embodiments of the present invention. As described above, battery lifetime is crucial to the proper and economical operation of an EMS. Therefore, the battery lifetime can be taken into account by modeling and estimating it based on the battery utilization in accordance with the present invention. As an illustrative example, it is noted that battery manufacturers and suppliers are responsible for the performance of their battery (e.g., during a warranty period after purchase). Hence, the battery performance is expected by customers to meet minimum, predefined requirements during its operation. There are multiple performance metrics for battery (e.g., battery power, capacity, etc.). For the application of behind-the-meter EMS, battery capacity is an important metric that can be highly influenced by the battery utilization and environment. The battery capacity can degrade each year during utilization, but it should retain a minimum value according to the warranty documents of the manufacturer. The capacity retention value can depend on one or more operating conditions (e.g., annual battery discharged energy, accumulated Depth-of-Discharge (DoD), annual average battery SoC (SoC), etc.) in accordance with various embodiments of the present invention.

Figure 3:
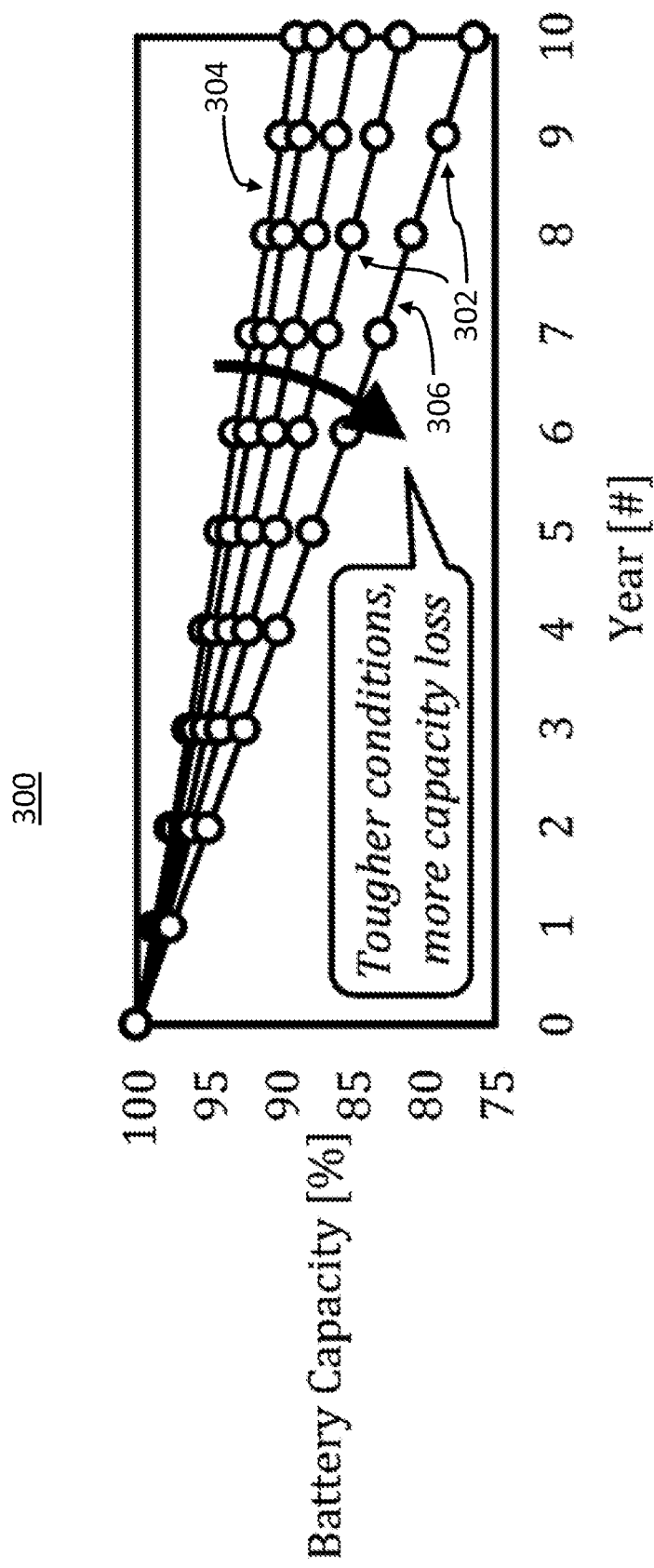
FIG. 3 is a graph illustrating an exemplary battery capacity loss rate over time, in accordance with the present invention.

Referring now to FIG. 3, with continued reference to FIG. 2, a graph 300 showing an exemplary battery capacity loss rate over time is illustratively depicted in accordance with an embodiment of the present invention. As is evident from the graph 300, the battery capacity that remains 302 (end-of-year retention value) decreases each year, and using the battery under tougher conditions worsen the capacity loss rate, where battery life for the least difficult exemplary conditions are represented by curve 304 and the most difficult are represented by curve 306. Examples of conditions that are considered tougher/more difficult operating conditions can be, for example, a higher battery average SoC, or high battery accumulated DoD (e.g., above a particular threshold) in accordance with various embodiments of the present invention. In practice, manufacturers, suppliers, and the companies who implement the behind-the-meter EMSs, can employ the system and method 200 to model these operating conditions and their respected parameters in order to predict the capacity loss rate after operating the battery in each of a plurality of operating conditions. This facilitates the EMSs in optimizing the battery operating conditions (e.g., battery utilization, charging, discharging, etc.) for lower capacity loss rate and longer battery lifetime in accordance with various embodiments of the present invention.

Figure 4:
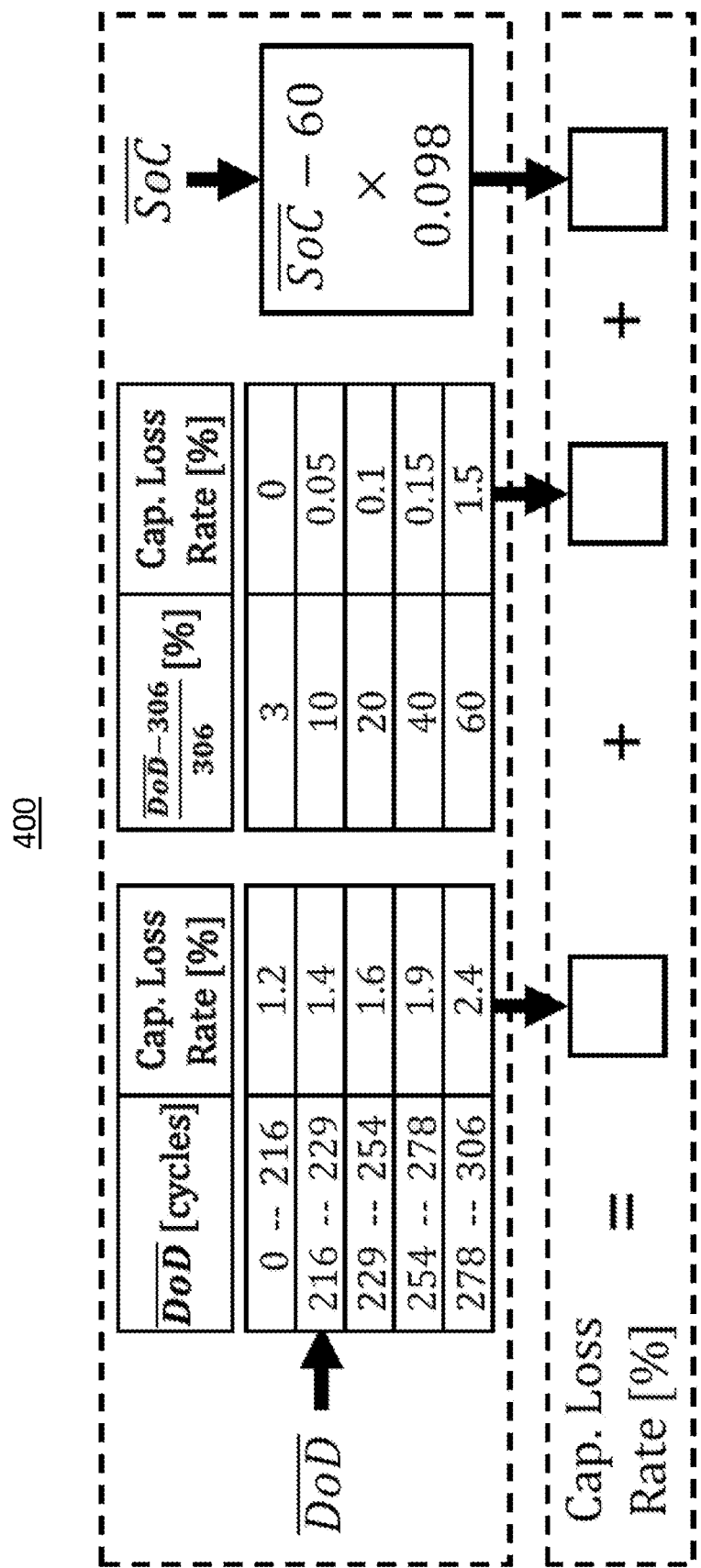
FIG. 4 is a diagram illustrating an exemplary battery capacity loss rate based on battery operating conditions, in accordance with the present invention.

Referring now to FIG. 4, with continued reference to FIG. 3, a diagram 400 showing an exemplary battery capacity loss rate based on battery operating conditions is illustratively depicted in accordance with an embodiment of the present invention. The diagram 400 shown an exemplary battery capacity loss rate (examples of which are shown graphically in FIG. 3), which can be conditioned and evaluated based on the values of accumulated DoD (DoD) and average SoC (SoC) in accordance with various embodiments of the present invention.

Referring now back to FIG. 2, in block 214, cascade demand threshold optimization for management of one or more EMSs can be performed in accordance with various embodiments of the present invention. The monthly layer demand threshold optimization in block 214 is an important function in the behind-the-meter EMS. As the EMS operation/control in the daily layer 202 can influence not only the demand charges, but also the battery lifetime, the optimization in block 214 includes multiple objectives (e.g., monthly demand charge, average battery SoC, accumulated battery DoD, etc.) for optimization in accordance with the present invention.

In some embodiments, the optimization in block 214 can formulate the problem using MILP in order to consider the exact daily layer behavior of the battery utilization and power demand from the grid as its constraints. Each day of a month can be optimized separately, considering the exclusive relationship between each day, to achieve more scalable and deterministic solution than any conventional systems and methods. The daily load profile can be extracted from a given load profile of the previous month. It is noted that the optimization can formulate the daily layer into regular intervals (e.g., 15-minute segments), taking average of the 1-minute sampled data. This is due to the fact that monitoring rate of the utility for demand charge calculation can be performed at regular intervals (e.g., every 15 minutes) in accordance with the present invention.

Multiple constraints can be added to formulate the daily layer behavior, and the battery SoC can be limited at each segment in order to avoid over charging or over discharging. An adjustable reserved capacity (e.g., $SoC_{min'}=35$) can also be considered to make up for any unexpected estimation error and possible demand threshold violation in the daily layer as follows:

$$SoC_{min} \leq SoC^i \leq SoC_{max} \quad (1)$$

A goal of an EMS is that the power demand by the customer can be met at all times. To achieve this, the present invention can provide a power balance between the power demand by the customer ($P_{load}$), battery discharge power ($P_{dis}$), battery charge power ($P_{cha}$), and the power demand by the grid ($P_{grid}$) as follows:

$$P_{grid}^i = P_{load}^i + P_{cha}^i - P_{dis}^i \quad (2)$$

In accordance with various embodiments, an important behavior in the Daily Layer for modeling is the battery utilization and the charging/discharging actions. The behavior can be conditioned and defined by the monthly demand threshold (DT), the power demand by the customer, and the battery limits as follows:

$$\text{if} \begin{cases} P^i_{load} < DT: P_{cha} = \min(DT - P^i_{load}, \overline{P}^i_{cha}), P_{dis} = 0 \\ P^i_{load} > DT: P_{cha} = 0, P_{dis} = \min(P^i_{load} - DT, \overline{P}^i_{dis}) \end{cases} \quad (3)$$

$$\longrightarrow \begin{bmatrix} \overline{P}^j_{cha} = \min\left(P_{max}, \frac{SoC_{max} - SoC^i}{\eta \times xxx}\right) \\ \overline{P}^j_{dis} = \min\left(P_{max}, \frac{SoC^i - SoC_{min}}{\eta \times xxx}\right) \end{bmatrix}$$

where battery discharging and charging can be prevented from occurring at the same time, and their power can be limited to the maximum battery power ($P_{max}$) and a specific boundary based on SoC value to prevent over loading, over charging, and over discharging of the battery in accordance with the present invention.

To improve the battery lifetime, the accumulated DoD can be minimized in accordance with the present invention. However, its influence on the battery lifetime is not significant until around 216 cycles per year. Therefore, in some embodiments, the optimization in block 214 can add a constraint proportional to the battery capacity ($E_{max}$) on the daily accumulated discharge energy as follows:

$$\sum_{i=1}^{96} P^j_{dis} \Delta t \leq \phi E_{max} \quad (4)$$

The cost function of the MILP optimization can be formulated as in Equation 5, with the monthly demand charge to be minimized being evaluated based on the peak power demand from the grid, and the average battery SoC and accumulated battery DoD being minimized in order to extend the battery lifetime as follows:

$$\mathcal{F} = \alpha[DC_{rate}^{any}\overline{P}_{grid}^{any} + DC_{rate}^{partial} \overline{P}_{grid}^{partial} + DC_{rate}^{peak} \overline{P}_{grid}^{peak}] + \beta[\overline{DoD} := \Sigma_{i=1}^{96} P^i_{dis}\Delta t] + \gamma[\overline{SoC} := 1/96 \Sigma_{i=1}^{96} SoC^i] \quad (5)$$

In accordance with various embodiments, the optimization problem in block 214 can include the constraints from equations (1)-(4), defined for predefined time segments (e.g., 96 time segments (15-minute interval)) in a day. To solve this daily multivariate optimization, the weight parameters [α, β, γ] in cost function equation 5 can be adjusted according to the priority of the optimization after each optimization variable is normalized. In various embodiments of the present, novel battery-optimal management system and method 200, a cascade two-level optimization can be implemented in block 214. In the first level, the demand charge minimization can be the main goal of optimization, without considering the battery lifetime variables in the cost function (β=γ=□).

The maximum possible monthly demand charge (DC) can be directly defined by the monthly peak power demand by the customer, or when there is no EMS. Given the minimum monthly demand charge (DC) evaluated from the first-level optimization, a limit on the monthly demand charge and its saving can be defined in accordance with the present invention. The limit can be adjusted using a demand charge saving loss rate (D·C$_{loss}$) as follows:

$$DC_{limit} = \underline{DC} + \dot{DC}_{loss} \times (\overline{DC} - \underline{DC}) \quad (6)$$

The demand charge limit can be given to the second level of optimization and can be added as a constraint on the evaluated monthly demand charge as follows:

$$[DC_{rate}^{any}\overline{P}_{grid}^{any} + DC_{rate}^{partial}\overline{P}_{grid}^{partial} + DC_{rate}^{peak}\overline{P}_{grid}^{peak}] \leq DC_{limit} \quad (7)$$

The second level of the optimization can mainly focus on minimization of the average battery SoC and accumulated battery DoD (α=∈), given the new upper bounded constraint from equation 7. The values of weight parameters [β, γ] can be adjusted such that the cost function variables are normalized. More priority can be given to the average battery SoC since the accumulated battery DoD can already have been taken care of by the constraint from equation 4.

In accordance with the present invention, the cascade optimization in the Monthly Layer in block 214 can be formulated as follows, with the optimization being solved for each day of a month and their corresponding demand thresholds being evaluated and stored:

$$\min_{[DT^x|\blacklozenge]} \mathcal{F}[\beta = \gamma = \epsilon] \quad (5) \quad\quad (8)$$

s.t. (1) – (4)

⇓ $DC_{limit}$ $$\min_{[DT^x|\blacklozenge]} \mathcal{F}[\alpha = \epsilon] \quad (5)$$

s.t. (1) – (4) and (7)

♦: $x \in$ [any, partial, peak]

In block 216, statistical monthly demand threshold selection for management of one or more EMSs can be performed in accordance with various embodiments of the present invention. A major challenge of monthly demand threshold selection is the lack of knowledge about the load pattern of the next month. Underestimating the demand threshold can result in more demand threshold violations and less demand charge savings, but better battery lifetime. On the other hand, overestimating the demand threshold can result in worse battery lifetime and potentially no demand charge savings. Thus, the demand threshold selection in block 216 can be determined and selected such that the savings are more than the violations, at least in the majority of the months, and further it can be personalized so that it provides maximum benefits and be appropriate for the load profile of particular customers in accordance with various embodiments of the present invention.

In various embodiments, the results of the daily optimizations can be stored alongside the pattern of the daily power demands by the customer. This data can be analyzed, and used for selecting an optimal monthly demand threshold appropriate for the electricity customer. This data provides information regarding how the load pattern would likely be in practice, and how much the demand thresholds should be to get the best battery lifetime and demand savings (for each day) in accordance with the various embodiments. However, as each day is different, the threshold selected in block 216 can be selected as one threshold for the whole month in accordance with the present invention.

Figure 5:
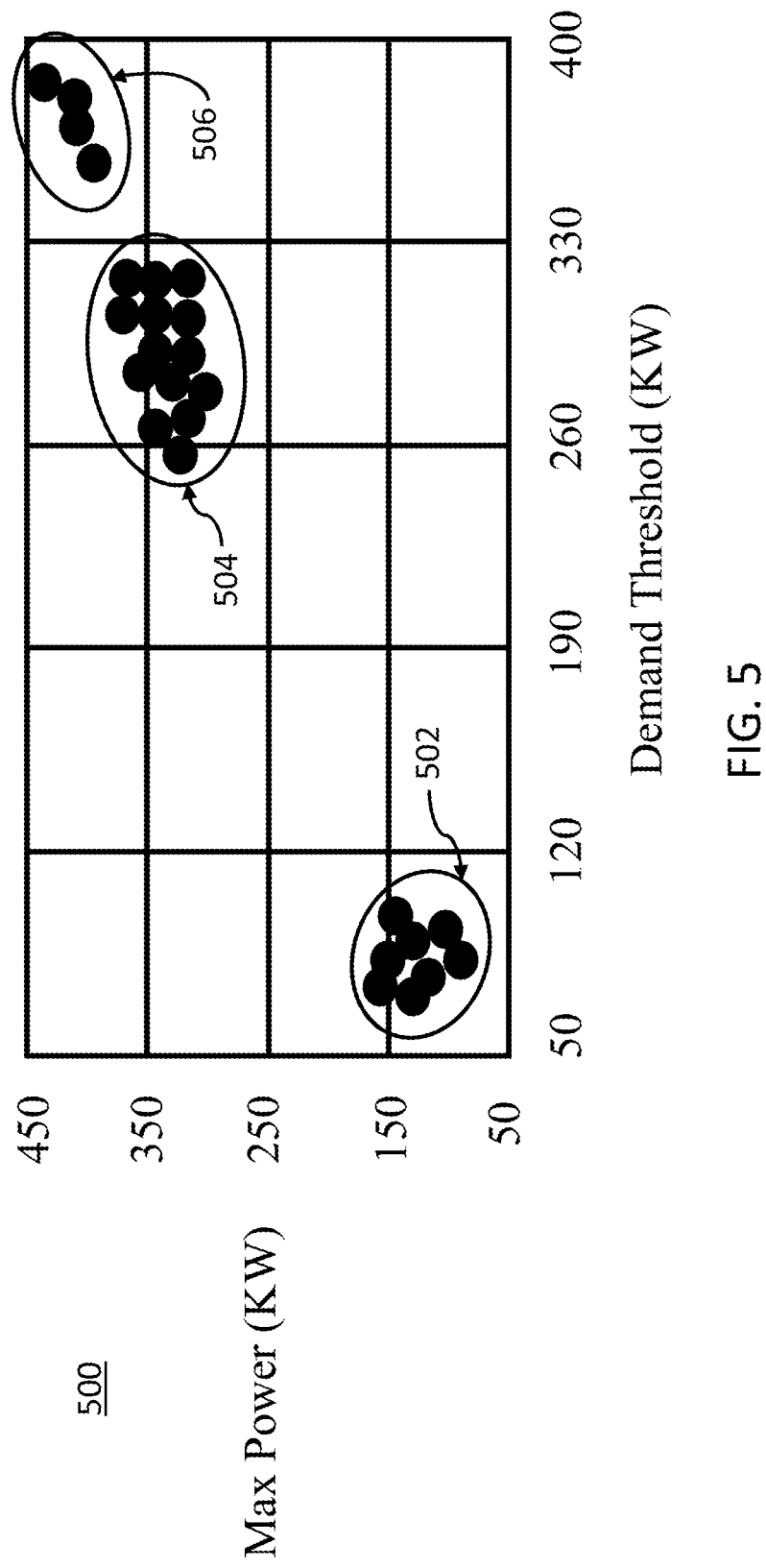
FIG. 5 is a graph illustrating a method for clustering and labeling of daily power demand for an energy consumer, in accordance with the present invention.

Referring now to FIG. 5, with continued reference to FIG. 2, a graph 500 showing a method for clustering and labeling of daily power demand for an energy consumer is illustratively depicted in accordance with an embodiment of the present invention.

In some embodiments, in block 216, the daily data can be analyzed for selection of a monthly demand threshold by clustering them into multiple groups, in which each group can represent the type of the business day (e.g., weekend 502, weekdays 504, and events 506). The graph 500 provides an exemplary illustrative example of the maximum daily power versus the evaluated demand thresholds of all the days in a month for a predetermined number of groups (e.g., 3 groups) of days. This clustering can be expected since for many load profiles based on their operation, there are weekends which the demand is generally the lowest, there are weekdays that have the typical demands; and there are some days in a month which are considered as events that demand higher or lower than other periods of time. It is noted that all load profiles will not have the same pattern and the data can still be clustered and labeled in any of a plurality of different number of groups and categories based on the customer business in accordance with various embodiments of the present invention.

Referring now back to FIG. 2, the data from all days in the month can be clustered using k-means unsupervised machine learning techniques in accordance with various embodiments of the present invention. There can be any of a plurality of daily features used for the clustering, including, for example, maximum power demand, average power demand, demand threshold, demand charge saving, average battery SoC, etc. In an exemplary embodiment, three (3) clusters have been employed as an appropriate number of clusters for individual load profiles. The group which has the typical demand (e.g., group of weekdays) can be selected as the dominant group that represents the load pattern of a next month. The mean demand threshold in the group can be selected as the monthly demand threshold. Thus, the novel statistical monthly demand selection in block 216 can be employed to avoid underestimating and overestimating for the given load profile in accordance with the present invention.

In block 218, battery charging and/or discharging operations of one or more EMSs can be controlled based on the battery-optimized demand charge minimization from the daily layer 202 and the monthly layer 208 in accordance with various embodiments of the present invention. The controlling in block 218 further provides optimal battery lifetime and performance by minimizing demand charge, as described above, in accordance with the present invention.

Figure 6A:
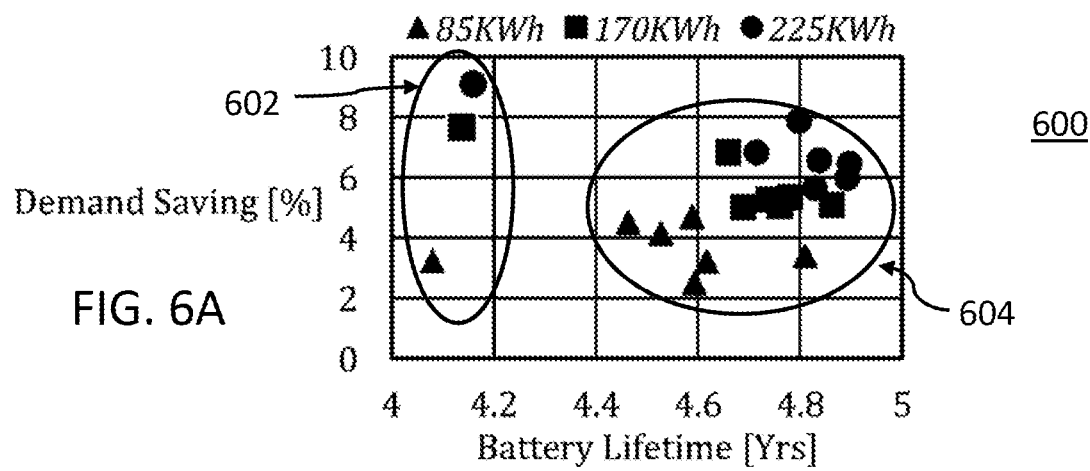
FIGS. 6A-6C are graphs illustrating real-world experimental performance results of a system/method for battery-optimized management of behind-the-meter energy storage/management systems using demand charge minimization, in accordance with the present invention.
Figure 6B:
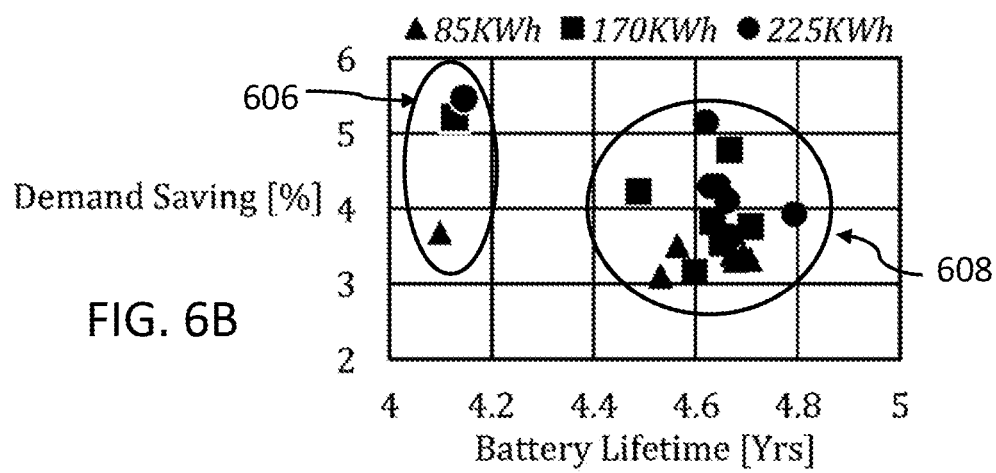
Figure 6C:
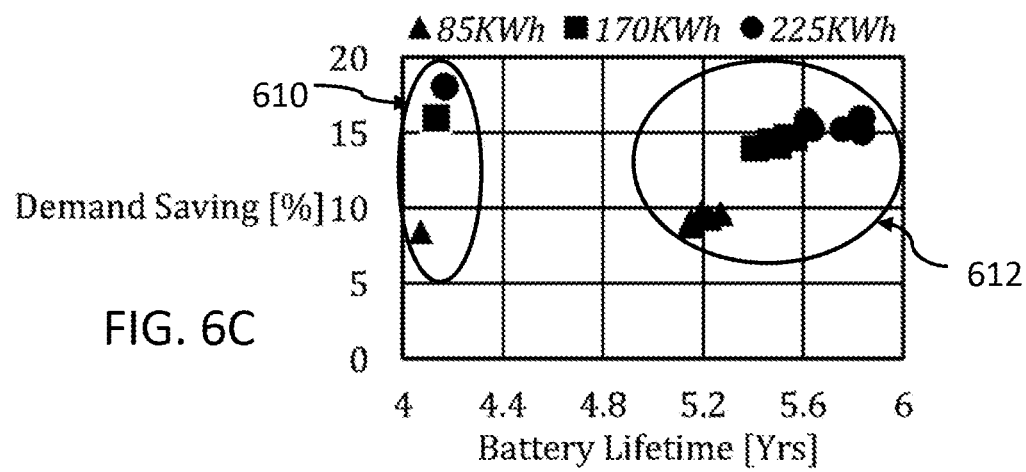

Referring now to FIGS. 6A-6C, graphs 600 showing real-world experimental performance results of a system/method for battery-optimized management of behind-the-meter energy storage/management systems using demand charge minimization are illustratively depicted in accordance with an embodiment of the present invention.

The performance of our battery optimal approach for demand charge reduction is analyzed and compared to the state-of-the-art conventional systems and methods. The comparison is done with the baseline approach, in which for ease of illustration, battery behavior and its lifetime are not discussed in the optimization, the battery charge and discharge power is optimized (instead of demand threshold) and the maximum of the power demand from grid is considered as the demand thresholds. The monthly demand threshold can be chosen arbitrarily from a fixed range of the evaluated daily thresholds.

In accordance with various embodiments of the present invention, experiments have been conducted on multiple real-life load profiles and battery configurations. For ease of illustration, it can be assumed that there are three load profiles of A (FIG. 6A), B (FIG. 6B), and C (FIG. 6C) that represent three different industry entities (e.g., industry types, different physical buildings, etc.), respectively. The load profiles include power demand data for every minute of a whole year. Furthermore, there are limited configurations of large-scale batteries appropriate to use, and we experimented the EMS using three battery configurations with energy capacities of 85 KWh, 170 KWh, and 225 KWh, and limited the output power to 100 KW.

In accordance with various embodiments, the graphs 600 can include multiple performance metrics to be compared, and that are analyzed and explained with respect to a plurality of metrics. In some embodiments, a metric to be determined is for optimal performance of the battery and/or EMS. The graphs 600 illustrate the demand saving in percentage and battery lifetime in years resulted from experimenting on multiple cases of the three load profiles. The three markers, in groups 602, 606, and 610 of FIGS. 6A, 6B, and 6C, respectively, show the results from the baseline (e.g., conventional) approach for three battery configurations. The remaining markers, in groups 604, 608, and 612 of FIGS. 6A, 6B, and 6C, respectively, show the results of controlling battery charging and/or discharging operations using the battery optimal systems and method in accordance with the present invention for the three battery configurations and different demand charge saving loss rate. The results for the different battery configurations are shown with three differently shaped markers (triangle for 85 KWh, square for 170 KWh, and circle for 225 KWh) for ease of illustration.

The results show a range of demand charge saving and how it influences the battery lifetime. Overall, the resulted battery lifetimes using the present invention are shown to be much better as compared to the baseline approach. The markers in groups 604, 608, and 612 are completely shifted to the right position of the chart. The battery lifetime has improved up to 20%, 15%, and 37% for A, B, and C load profiles for FIGS. 6A, 6B, and 6C, respectively. The difference in the battery lifetime improvement for each load profile can at least partially be attributed to the predictions of the pattern of the next month given the current month in accordance with various embodiments of the present invention. Some load profiles (like C) may have more predictable pattern that EMS can leverage to select the demand threshold in a more optimal way.

Another metric which can be compared is referred to as a manageable trade-off. Table 1 (below) summarizes the results of the battery optimal approach in accordance with the present invention as compared to the baseline (e.g., conventional) approach. In other words, the table shows what range of demand charge saving can be achieved for each load profile using the present invention. Further, the resulted battery lifetime for that range is also shown. For example, for the A load profile, previously, a consumer could save 6.7% with the battery lifetime of 4.1 years. While, a consumer can now save 5.0% with the battery lifetime of 4.7 years. As for the C load profile, previously a consumer could save 14.1% with the battery lifetime of 4.1 years. While a consumer can now save 13.4% with the battery lifetime of 5.6 years in accordance with various embodiments of the present invention.

TABLE 1

System Performance Summary Comparison to Baseline

| | Baseline | Present Invention From | To |
|---|---|---|---|
| Load Profile A | | | |
| Demand Saving | 6.7% | 6.5% | 5.0% |
| Battery Lifetime | 4.1 years | 4.7 years | 4.9 years |
| Load Profile B | | | |
| Demand Saving | 4.8% | 4.5% | 3.7% |
| Battery Lifetime | 4.1 years | 4.6 years | 4.7 years |
| Load Profile C | | | |
| Demand Saving | 14.1% | 13.4% | 13.4% |
| Battery Lifetime | 4.1 years | 5.5 years | 5.6 years |

As described in further detail above, the range of improvement possible can be highly affected by the accuracy and predictability of the load profile. Since the demand thresholds can be optimized and selected based on the load profile of the previous month, there can be estimation error and indeterminacy in practice. With the novel system and method for controlling EMS operations in accordance with various embodiments, the selection is more determined and accurate than conventional systems and methods considering the load profile. However, there could still be indeterminacy in the estimation and solution which would affect the range of performance. It is noted that more battery lifetime can potentially be achieved by sacrificing more demand charge saving, but in practice, more sacrifice in savings often does not make economic sense. Hence, in some embodiments, the demand charge saving loss rates are limited in accordance with the present invention.

It is evident from the graphs that higher battery lifetimes can been achieved with almost the same demand charge saving using the present invention, and that there are some cases (e.g., especially with smaller battery sizes) where the demand charge savings have been increased as well. One more important factor we have introduced in the battery optimal system and method of the present invention is the manageable trade-off between the battery lifetime and the demand charge savings. In some embodiments, at least in part to the cascade optimization, this trade off can be efficiently and accurately managed based on individual preferences/requirements (e.g., from designer, customer, etc.) in order to determine and apply the optimal economical choice of monthly thresholds and battery sizing for its customers given the load profile in accordance with the present invention.

Figure 7:
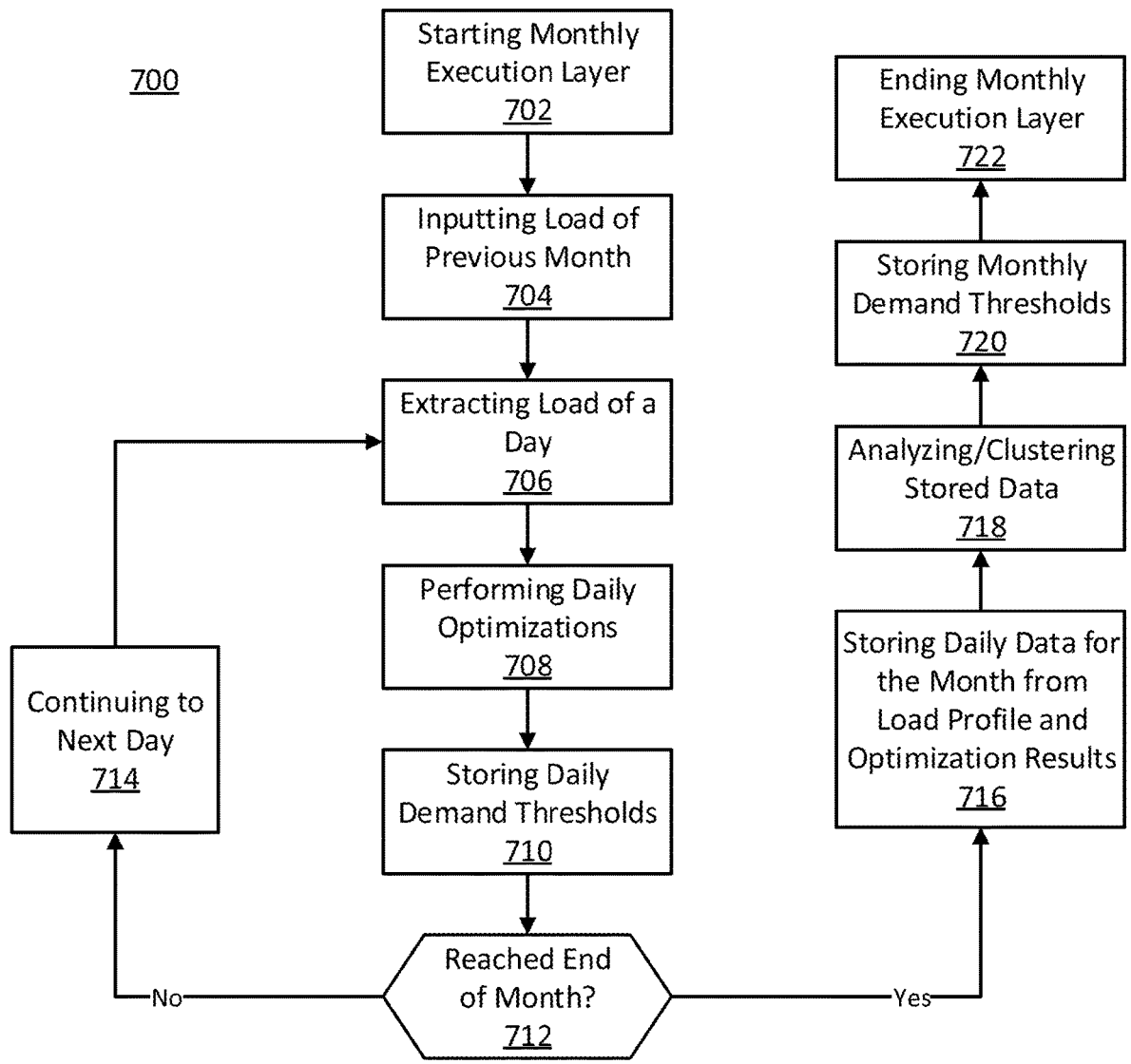
FIG. 7 is a block/flow diagram illustrating a high-level method for determining and selecting an optimal monthly demand threshold for management of behind-the meter energy storage/management systems for battery-optimized demand charge minimization, in accordance with the present invention.

Referring now to FIG. 7, a block/flow diagram showing a high-level method 700 for determining and selecting an optimal monthly demand threshold for management of behind-the meter energy storage/management systems for battery-optimized demand charge minimization by is illustratively depicted in accordance with an embodiment of the present invention.

In some embodiments, in block 702, a monthly execution layer can be started, and a load of a previous month as a predicted pattern of the load can be input in block 704. A load of a day can be extracted in block 706, and daily optimizations configured to minimize demand charges and extend battery lifetime can be performed in block 708 in accordance with various embodiments of the present invention. In block 710, demand thresholds for each day can be stored for future access. If it is determined in block 712 that the end of the month has not been reached, then the method 700 can continue to the next day in block 714, and blocks 706, 708, and 710 can be iteratively repeated for subsequent days until it is determined in block 712 that the end of the month has been reached.

In various embodiments, if it is determined in block 712 that the end of the month has been reached, daily data for each day of the month from load profiles and optimization results can be stored in block 716 in accordance with the present invention. In block 716, the daily data for each day of the month can be stored using the load profile and the results from daily optimizations, and the data can include any of a plurality of features (e.g., maximum power demand, average power demand, demand charge saving, battery discharged energy, average battery SoC, etc.) in accordance with various embodiments of the present invention.

In block 718, the data stored in block 716 can be analyzed and categorized using a clustering method to determine appropriate, optimal demand thresholds for particular load profiles. In various embodiments, the data from all days in the month can be clustered using k-means unsupervised learning techniques, and the group that shows the typical demand can be selected as the dominant group that represents the load pattern for the next month. The mean demand threshold in the group can be selected as the monthly demand threshold in accordance with the present invention. In block 720, the monthly demand thresholds (e.g., average power demand, maximum power demand, demand charge saving, etc.) can be saved for use by a daily layer, and execution of the monthly layer can be ended in block 722 in accordance with the present invention.

In this invention, a novel system and method for monthly demand threshold selection has been introduced within the Monthly Layer using a clustering machine learning technique (k-means) in accordance with various embodiments. The algorithm can be implemented such that to consider the behavior of the load demands and possible demand charge savings in order to statistically evaluate the proper and more deterministic monthly demand threshold for a given load profile of a customer.

The daily data can be analyzed by clustering it into multiple groups, and each group can represent the type of the business day. For instance, when considering the maximum daily power versus the evaluated demand thresholds of all the days in a month, there can be three groups of days, as described above with reference to FIG. 5. This clustering can be expected since for many load profiles based on their operation, there are weekends which the demand is generally the lowest, there are weekdays that have the typical demands; and there are some days in a month which are considered as events that demand higher or lower than other periods of time. It is noted that all load profiles will not have the same pattern and the data can still be clustered and labeled in any of a plurality of different number of groups and categories based on the customer business in accordance with various embodiments of the present invention.

The data from the load profile describes the pattern of the power demand from the customer. Moreover, the results of the daily optimizations can illustrate how much the demand thresholds should be to get the best battery lifetime and possible demand savings (e.g., for each day). This data can to be analyzed for selecting a monthly demand threshold appropriate for the electrical customer in accordance with various embodiments. Afterwards, the stored data from all days in the month can be clustered using k-means unsupervised machine learning technique in accordance with the present invention. It is noted that any other machine learning technique is applicable in accordance with various embodiments.

Figure 8:
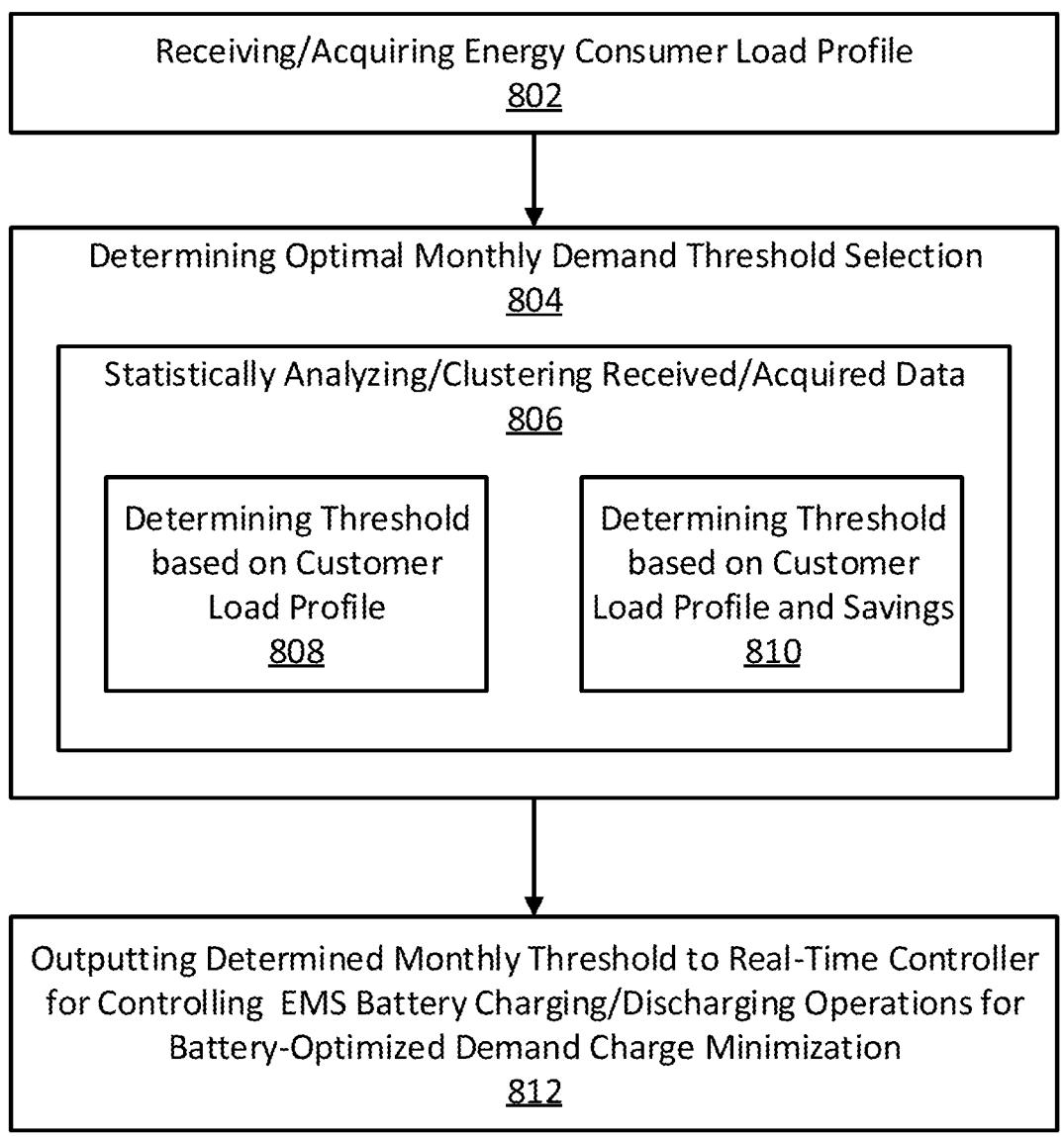
FIG. 8 is a block/flow diagram illustrating a method for optimal monthly demand threshold selection for battery-optimized demand charge minimization, in accordance with the present invention.

Referring now to FIG. 8, a block/flow diagram showing a method 800 for optimal monthly demand threshold selection for battery-optimized demand charge minimization is illustratively depicted in accordance with an embodiment of the present invention.

In various embodiments, energy consumer load profiles can be received/acquired in accordance with the present invention, and a novel monthly demand threshold selection can be performed in block 804. The statistical analysis and clustering of the present invention to categorize the days in a month is performed in block 806, and an exemplary embodiment of the clustering is illustratively depicted in FIG. 5. Two different clustering features can be employed, namely determining threshold based on customer load profile in block 808 and determining threshold based on customer load profile and savings in block 810.

There are multiple daily features that can be utilized for the clustering. For exemplary purposes, we consider two variations for features used for clustering: load profile in block 808 and load profile and savings in block 810. With respect to the load profile in block 808, features such as maximum power demand and average power demand can be considered into the clustering algorithm to group multiple days. It can capture the behavior of the demanded power from the customer, and thus enable more deterministic solution in terms of avoiding overestimation and underestimation of the load pattern of the next month as compared to conventional systems and methods.

With respect to the load profile and savings in block 810, features such as maximum power demand, average power demand, demand threshold, demand charge saving, average battery SoC, and accumulated discharged energy can be considered into the clustering algorithm to group multiple days. It can capture not only the behavior of the demanded power from the customer, but also the possible demand charge savings and expected battery lifetime after the optimization in accordance with various embodiments. It will enable more deterministic solution in terms of avoiding overestimation and underestimation of the load pattern of the next month, and thus, maximize demand charge saving and battery lifetime in accordance with the present invention.

In an exemplary embodiment, three (3) clusters have been employed as an appropriate number of clusters for individual load profiles. The group which has the typical demand (e.g., group of weekdays) can be selected as the dominant group that represents the load pattern of a next month. The mean demand threshold in the group can be selected as the monthly demand threshold. Thus, the novel statistical monthly demand selection in block 804 can be employed to avoid underestimating and overestimating for the given load profile in accordance with the present invention.

In various embodiments, for the problem of appropriate monthly demand threshold selection for a given load profile, we have introduced a new statistically-based system and method. In this solution method 800, there is a new selection algorithm applied in block 806 which implements a clustering machine learning technique (such as k-means) to analyze the stored daily data for a month. Hence, different days in a month can be categorized into multiple groups. Each group can represent the type of the business day, and there can be at least two variations to this solution in accordance with the present invention, namely load profile only in block 808 (e.g., where only limited features from the load profile are extracted for clustering), and load profile and savings in block 810 (e.g., where not only features from the load profile are extracted, the results from the daily optimizations are also considered into the clustering. In various embodiments, in block 812, a determined monthly threshold can be output to a real-time controller (e.g., local or remote controller), and EMS battery charging and/or discharging operations can be executed based on the battery optimized demand charge minimization provided by various embodiments of the present invention.

This novel clustering of the days and the proposed selection algorithm can enable categorization of the days in a month to multiple groups and types in accordance with various embodiments. Therefore, a more deterministic and adaptive solution in terms of demand thresholds is evaluated for a specific load profile and customer. It (both variations) can provide more demand charge saving as well as battery lifetime extension as compared to the current approaches in accordance with the present invention.

Figure 9:
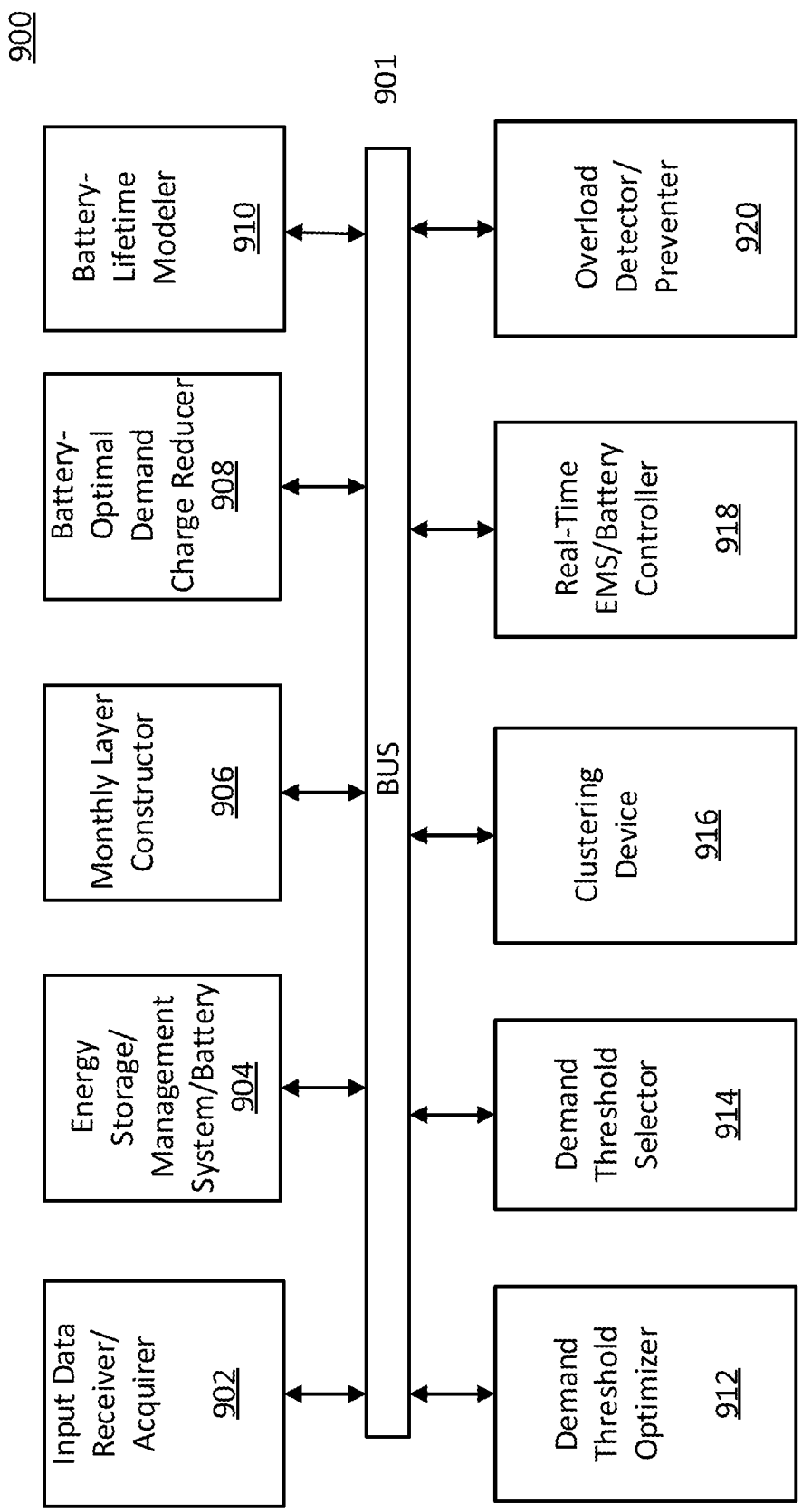
FIG. 9 is a block/flow diagram illustrating a system for management of behind-the meter energy storage/management systems for battery-optimized demand charge minimization, in accordance with the present invention.

Referring now to FIG. 9, a block/flow diagram showing a system for management of behind-the meter energy storage/management systems for battery-optimized demand charge minimization is illustratively depicted in accordance with an embodiment of the present invention.

In some embodiments, input data can be received in block 902 for various functions/performance measurements for one or more EMSs/Batteries for constructions of a monthly layer by a monthly layer constructor in block 906. In various embodiments, an optimal monthly demand threshold can be selected in block 914 based on the output of a battery optimal demand charge reducer 908, a battery-lifetime modeler 910, and a demand threshold optimizer 912 in accordance with the present invention. A clustering device 916 can be employed for clustering daily optimal demand thresholds for each day of the month into one of a plurality of groups, and determining a dominant group representative of a load pattern for a next month. A real-time EMS/battery controller 918 can be employed to optimally control charging and/or discharging operations for the EMS/battery 904, and an overload detector/preventer 920 can be employed to prevent overcharging, overdischarging, overloading, etc. in accordance with various embodiments of the present invention.

While many aspects of system 900 are described in singular form for the sakes of illustration and clarity, the same can be applied to multiples ones of the items mentioned with respect to the description of system 900. For example, while a single EMS/battery 904 is described, more than one EMS/battery 904 can be used in accordance with the teachings of the present principles, while maintaining the spirit of the present principles. Moreover, it is appreciated that the EMS/battery 904 is but one aspect involved with system 900 than can be extended to plural form while maintaining the spirit of the present principles.

In the embodiment shown in FIG. 9, the elements thereof are interconnected by a bus 901. However, in other embodiments, other types of connections can also be used. Moreover, in an embodiment, at least one of the elements of system 900 is processor-based and/or a logic circuit. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 900 are readily determined by one of ordinary skill in the art, given the teachings of the present principles provided herein, while maintaining the spirit of the present principles.

Figure 10:
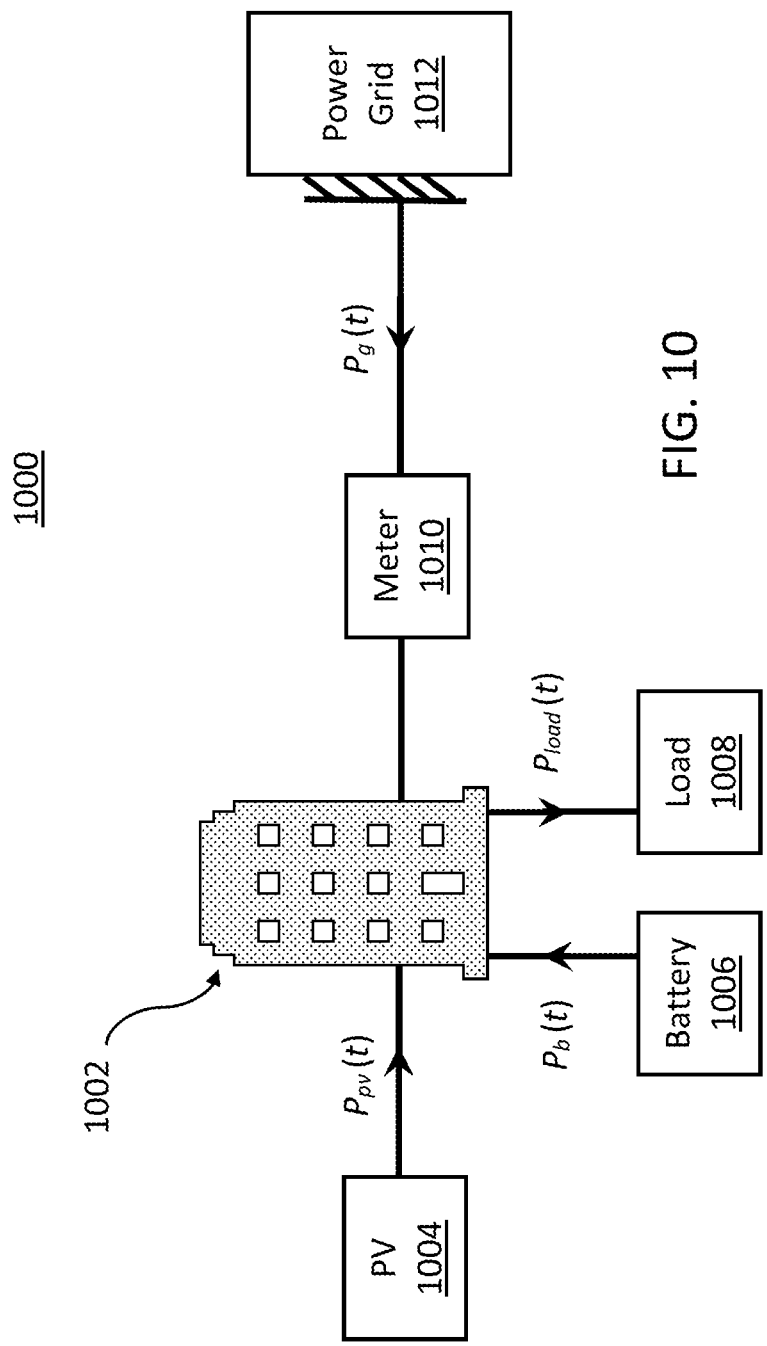
FIG. 10 is a high-level block/flow diagram illustrating a system for real-time management of energy storage/management systems in commercial and/or residential buildings, in accordance with the present invention.

Referring now to FIG. 10, a high-level block/flow diagram showing a system 1000 for real-time management of behind-the meter energy storage/management systems for battery-optimized demand charge minimization in commercial and/or residential buildings is illustratively depicted in accordance with an embodiment of the present invention.

In one embodiment, the system 1000 can be a behind-the-meter 1010 system, and can control the power charging and discharging for a building 1002 (e.g., Commercial, industrial, residential, etc.) in accordance with the present invention. The system 1000 can include a load 1008 served by, for example, a photovoltaic (PV) power generating system 1004, which can be used to complement the main power grid 1012 and/or a battery energy storage system (BESS) 1006 in accordance with various embodiments of the present invention.

In some embodiments, the EMS 1000 can be implemented as a two-layer architecture including monthly and daily layers in accordance with the present invention, as described in further detail above with reference to FIGS. 2, 7, and 8. An objective of the monthly layer is to calculate the optimal peak grid powers to follow during the next billing cycle. These target grid powers can be calculated based on regular, predetermined time intervals (e.g., 15-minute intervals) and can be referred to as demand charge thresholds (DCTs). It is noted that PV-utilization is a daily problem. However, demand charge is a monthly problem and may be already defined using historical data for the current month. As a result, during daily operation, the aggregated system can efficiently provide power by following predefined thresholds (e.g., DC thresholds) calculated in the monthly layer, as described in further detail above with reference to FIGS. 2, 7, and 8.

In some embodiments, the daily layer can be responsible for the continuous adjustment of battery power and grid power based on the most recent information in real-time. A rule-based controller can be used in the daily layer to track DCT values generated in the monthly layer, and to perform optimal charging and/or discharging functions for the battery in accordance with various embodiments of the present invention. Further, real-world experimental results show that controlling charging and/or discharging operations for a battery in an EMS based on the determined battery-optimized demand charge minimization provides significant improvements over conventional systems and methods at least with respect to minimizing monthly power demands for consumers, and extending battery life in accordance with various embodiments of the present invention.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for controlling behind-the meter energy storage/management systems (EMSs) for battery-optimized demand charge minimized operations, comprising:
   determining an optimal monthly demand charge threshold based on at least one of a received customer load profile and a customer load profile and savings, the determining further comprising:
      iteratively performing daily optimizations to determine a daily optimal demand threshold for each day of a month;
      selecting a monthly demand threshold by clustering the daily optimal demand thresholds for each day of the month into one of a plurality of groups, and
   determining a dominant group representative of a load pattern for a next month; and
      determining a mean demand threshold for the dominant group, and
   selecting the mean demand threshold as the monthly demand threshold; and
   providing continuous battery-optimized demand charge minimized EMS operations based on the monthly demand threshold using a real-time controller configured for overriding the optimal charging/discharging profiles when a monthly demand threshold violation is detected.

2. The method as recited in claim 1, wherein the clustering is executed using k-means unsupervised learning.

3. The method as recited in claim 1, further comprising performing monthly demand threshold optimization based on monthly demand charge, average battery state-of-charge (SoC), and accumulated battery depth-of-discharge (DoD).

4. The method as recited in claim 1, further comprising modeling and controlling daily battery utilization, charging actions, and discharging actions as defined by the monthly demand threshold (DT), power demand by a consumer, and battery limits.

5. The method as recited in claim 1, wherein the plurality of groups from the clustering include distinct groups for weekends, weekdays, and events.

6. The method as recited in claim 1, wherein data utilized for the daily optimizations includes one or more of maximum power demand, average power demand, daily demand threshold, demand charge saving, battery discharged energy, and average battery state-of-charge (SoC).

7. The method as recited in claim 1, wherein the optimal monthly demand charge threshold selection is based only on a received customer load profile, the load profile including features of maximum power demand and average power demand.

8. The method as recited in claim 1, wherein the optimal monthly demand charge threshold selection is based on a received customer load profile and savings, the load profile and savings including features of maximum power demand, average power demand, demand threshold, demand charge saving, average battery state-of-charge (SoC), and accumulated discharged energy.

9. A system for controlling behind-the meter energy storage/management systems (EMSs) for battery-optimized demand charge minimized operations, comprising:
   a processor device operatively coupled to a non-transitory computer-readable storage medium, the processor being configured for:
      determining, using a monthly layer constructor, an optimal monthly demand charge threshold based on at least one of a received customer load profile and a customer load profile and savings, the determining further comprising:

iteratively performing, using a demand threshold optimizer, daily optimizations to determine a daily optimal demand threshold for each day of a month;

selecting a monthly demand threshold by clustering the daily optimal demand thresholds for each day of the month into one of a plurality of groups, and determining a dominant group representative of a load pattern for a next month; and determining a mean demand threshold for the dominant group, and selecting, using a demand threshold selector, the mean demand threshold as the monthly demand threshold; and providing continuous battery-optimized demand charge minimized EMS operations based on the monthly demand threshold using a real-time controller configured for overriding the optimal charging/discharging profiles when a monthly demand threshold violation is detected.

10. The system as recited in claim 9, wherein the clustering is executed using k-means unsupervised learning.

11. The system as recited in claim 9, wherein the processor is further configured for performing, using the demand threshold optimizer, monthly demand threshold optimization based on monthly demand charge, average battery state-of-charge (SoC), and accumulated battery depth-of-discharge (DoD).

12. The system as recited in claim 9, wherein the processor is further configured for controlling daily battery utilization, charging actions, and discharging actions as defined by the monthly demand threshold (DT), power demand by a consumer, and battery limits.

13. The system as recited in claim 9, wherein the plurality of groups from the clustering include distinct groups for weekends, weekdays, and events.

14. The system as recited in claim 9, wherein data utilized for the daily optimizations includes one or more of maximum power demand, average power demand, daily demand threshold, demand charge saving, battery discharged energy, and average battery state-of-charge (SoC).

15. The system as recited in claim 9, wherein the optimal monthly demand charge threshold selection is based only on a received customer load profile, the load profile including features of maximum power demand and average power demand.

16. The system as recited in claim 9, wherein the optimal monthly demand charge threshold selection is based on a received customer load profile and savings, the load profile and savings including features of maximum power demand, average power demand, demand threshold, demand charge saving, average battery state-of-charge (SoC), and accumulated discharged energy.

17. A non-transitory computer readable storage medium comprising a computer readable program for controlling behind-the meter energy storage/management systems (EMSs) for battery-optimized demand charge minimized operations, comprising:

determining an optimal monthly demand charge threshold based on at least one of a received customer load profile and a customer load profile and savings, the determining further comprising:

iteratively performing daily optimizations to determine a daily optimal demand threshold for each day of a month;

selecting a monthly demand threshold by clustering the daily optimal demand thresholds for each day of the month into one of a plurality of groups, and determining a dominant group representative of a load pattern for a next month; and determining a mean demand threshold for the dominant group, and selecting the mean demand threshold as the monthly demand threshold; and providing continuous battery-optimized demand charge minimized EMS operations based on the monthly demand threshold using a real-time controller configured for overriding the optimal charging/discharging profiles when a monthly demand threshold violation is detected.

18. The computer readable storage medium as recited in claim 17, wherein the clustering is executed using k-means unsupervised learning.

19. The computer readable storage medium as recited in claim 17, further comprising performing monthly demand threshold optimization based on monthly demand charge, average battery state-of-charge (SoC), and accumulated battery depth-of-discharge (DoD).

20. The computer readable storage medium as recited in claim 17, further comprising modeling and controlling daily battery utilization, charging actions, and discharging actions as defined by the monthly demand threshold (DT), power demand by a consumer, and battery limits.

* * * * *